(No Model.)
A. MECHWART.
ROLLER MILL.
No. 267,555. Patented Nov. 14, 1882.
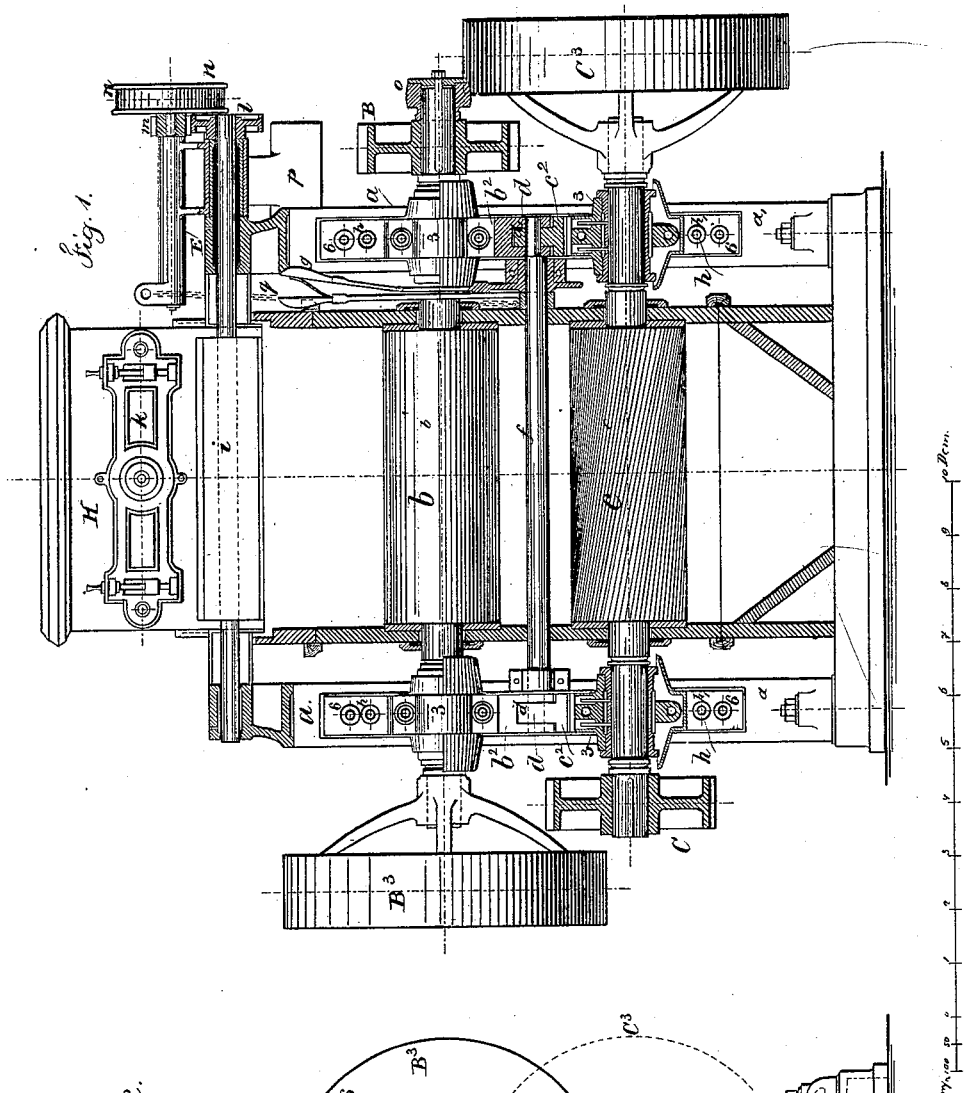
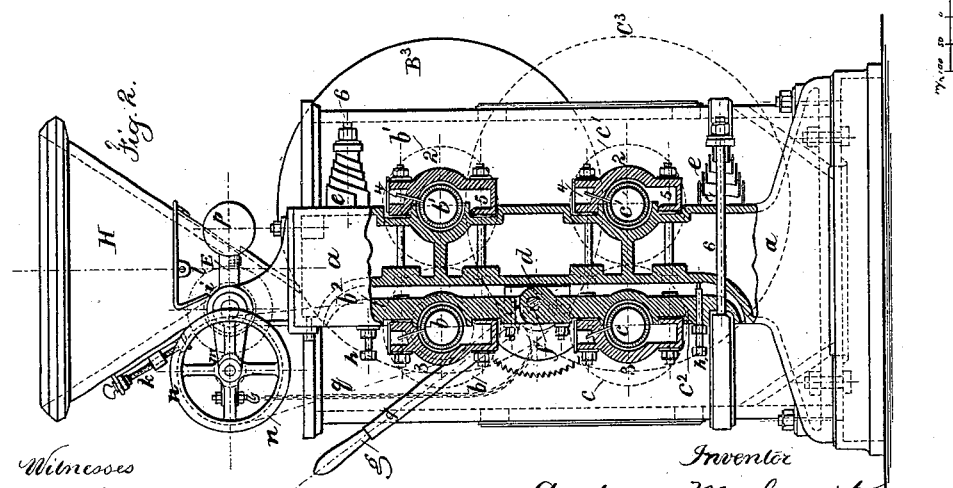
Witnesses
Chas H. Smith
J. Haitz
Inventor
Andreas Mechwart
for Lemuel W. Serrell atty

United States Patent Office.

ANDREAS MECHWART, OF BUDA-PESTH, AUSTRIA-HUNGARY.

ROLLER-MILL.

SPECIFICATION forming part of Letters Patent No. 267,555, dated November 14, 1882.

Application filed March 27, 1882. (No model.) Patented in Austria July 5, 1881, No. 24,544; in Hungary July 5, 1881, No. 23,866, and in Denmark January 24, 1882, No. 2,476.

*To all whom it may concern:*

Be it known that I, ANDREAS MECHWART, of Buda-Pesth, Austria-Hungary, have invented an Improvement in Roller-Mills for Crushing Wheat and other Cereals and forming Flour or Meal, of which the following is a specification.

Letters Patent have been granted to me for this invention in the following countries, viz: Austria, July 5, 1881, No. 24,544; Hungary, July 5, 1881, No. 23,866; Denmark, January 24, 1882, No. 2,476.

I provide peculiar yielding bearings for the movable roller in each pair of rollers, so that the rollers can be separated so that they do not run in contact with each other when there is no grain between them; and I connect the mechanism that is used to separate the rollers with the supply-roller in such a manner that the grain is stopped when the rollers are separated, and the reverse. By this improvement the grain cannot pass through without being properly ground, because the supply is cut off at the same time that the rollers are separated; neither can the rollers be pressed together without starting the supply. Hence the rollers will not be injured by rubbing directly against each other.

Several modes of accomplishing the before-named object may be made use of. I will describe herein one of those modes, and in other applications, corresponding in date, some of the other forms of mechanism for effecting the said objects are set forth.

In the drawings, Figure 1 is an elevation sidewise of the rollers, some of the parts being in section; and Fig. 2 is an elevation endwise of the rollers, the journals and boxes being in section.

There are two vertical frames, $a$ $a$, with suitable bases or feet, bolted to a bed-plate. These frames are made with flanges around their edges, extending inwardly. In Fig. 2 the frame is partially in section to show the flanges more clearly.

The pairs of rollers $b$ $b'$ and $c$ $c'$ are supported by vertical frames $a$ $a$, that are between the respective journals. The boxes of the journals of the rollers $b'$ $c'$ are upon the edges of the frames themselves. Each journal-box or bearing is composed of a semicircular recess in the frame itself, and a movable cap, 2, having a similar recessed surface that is secured by bolts, and can be removed with facility by taking off the nuts. This allows for the removal of either roller $b'$ or $c'$, if necessary, without detaching any other parts of the machine.

Each journal-box or cap 2 has an oil-receptacle, 4, above the journal and a drip-receptacle, 5, below the same.

The journal-boxes 3 of the rollers $b$ $c$ are made the same as before described; but instead of being bolted to the frame they are upon separate levers $b^2$ $c^2$, which are hinged together in pairs at $d$, and the pins of the hinges are the eccentric ends of the cross-shaft $f$.

The shaft $f$ has separate stationary bearings on the frame $a$, so as to be supported thereby, and the ends of the shaft $f$ support the levers and rollers.

The bolts or draw-bars 6 pass through the outer ends of the respective levers, and freely through the frames and the springs $e$, and there are nuts at the ends of the draw-bars 6, by which the pressure exerted by the springs $e$ to draw the rollers $b$ $c$ toward the rollers $b'$ $c'$ can be regulated; and the stop-screws $h$, passing through the respective levers $b^2$ $c^2$, limit the approach of one roller toward the other.

The draw-bars 6 keep the outer ends of the levers in their proper places, but allow the levers to yield as the rollers $b$ $c$ separate from the rollers $b'$ $c'$. By partially rotating the shaft $f$ the eccentric pins at its ends will move the hinges $d$ toward or from the frames $a$, and in so doing will bring the rollers toward each other or separate them.

The lever $g$ is employed for this purpose. It is fastened at its end to the said shaft $f$, and it is preferably provided with a spring pawl or catch passing into a disk that is attached to the journal-box of the shaft $f$ on the frame $a$, so that the lever $g$ will be securely held in any position to which it may be moved.

The material to be crushed or ground is placed in the hopper H, and there is a roller, $i$, at the bottom, and an adjustable gate, $k$, to regulate the quantity of material fed to the mill, as in my Patent No. 251,124. The roller $i$ is connected by suitable mechanism with the devices that separate one roller from the other in the pair or pairs of rollers used in this class of mills, so that the roller $i$ is automatically stopped when the rollers of the mill are separated, and started again when the rollers of the mill are brought together. This automatic mechanism can be of any desired kind. I have represented a band-wheel, $n$, upon a stud on the balanced lever E, and this band-wheel $n$ is revolved by a belt from a pulley, $o$. The pinion $m$ upon the band-wheel $n$ gives motion to the gear-wheel $l$ and roller $i$. The shaft of the roller $i$ forms the pivot for the lever E, and the counter-weight $p$ is sufficient to strain the belt between $o$ and $n$ and cause the rotation of the feed-roller $i$, but when the lever $g$ is moved to separate the rollers $b\ b'\ c\ c'$ a chain, $q$, passing loosely from the lever E to the lever $g$, is tightened and drawn upon sufficiently to move the band-wheel $n$ downwardly and loosen the belt, causing the feed-roller $i$ to stop and the feed of material to the mill to cease. The pair of rollers $b\ b'$ are geared together at B, and driven by the pulley $B^3$ and belt or gearing. The gears C connect the pair of rollers $c\ c'$, and $C^3$ is the driving-pulley. The rollers $b\ b'$ are either plain or grooved, and the rollers $c\ c'$ are grooved in the same direction, and act in the manner described in my Patent No. 251,124, and the gearing B C is such that the surfaces of the respective rollers move in the same direction where the grinding or crushing operations take place; but one surface is moving at least twice as fast as the other. I find that by making the top pair of rollers, $b\ b'$, smooth and the lower pair, $c\ c'$, grooved the grain is crushed and squeezed so as to split open the hulls and separate the flour to a considerable extent, and the second pair, $c\ c'$, rub the flour out of the hulls without breaking the hulls as small as they would be if the pairs of rollers were both grooved; but this feature in itself I do not claim. Where only one pair of rollers, $b\ b'$, is made use of the journal-boxes and levers, bolts and springs, and the eccentric shaft for the pivot-pins of the levers will remain unchanged, the pair of rollers $c\ c'$ being removed, and in this case the levers $c^2$ will not be required. There is an inclosure of wood or sheet metal around the rollers to retain the material that is being ground, and a delivery hopper or chute at the bottom.

I claim as my invention—

1. The combination, with the pair of rollers $b\ b'$, of the levers $b^2$, the cross-shaft $f$, having eccentric ends forming hinge-pins for the levers $b^2$, and springs to apply yielding pressure to keep the roller $b$ toward the roller $b'$, substantially as set forth.

2. The combination, with the pair of rollers in a roller-mill, of the vertical frames $a$, between the journals of the rollers, and the journal-boxes at the opposite and outer edges of such frames $a$, with removable caps, whereby either roller can be taken out after the caps of the journal-boxes have been removed without disturbing any other parts, substantially as set forth.

3. The combination, with the pair of rollers in a roller-mill, of levers $b^2$, stop-screws $h$, draw-bars 6, springs $e$, and frame $a$, the frames being between the respective journals and the draw-bars passing through such frames, substantially as set forth.

4. The combination, with the hopper and feed-roller $i$, of the weighted lever E, gear-wheels $l\ m$, band-wheel $n$, belt, pulley $o$, rollers $b\ b'$, levers $b^2$ and $g$, eccentric shaft $f$, and connection between the levers $g$ and E, substantially as set forth.

5. The combination, with the pairs of rollers $b\ b'\ c\ c'$, of the vertical frames $a$, passing up between the journals of the respective pairs of rollers, the levers $b^2\ c^2$, hinged together in pairs, the cross-shaft $f$, with eccentric ends forming the pins of the lever-hinges, the journal-boxes of the rollers $b\ c$ upon the levers $b^2\ c^2$, respectively, the stop-screws $h$, draw-bars 6, and springs $e$, substantially as specified.

Signed by me this 1st day of March, A. D. 1882.

ANDREAS MECHWART.

Witnesses:
MAX GRÜNBAUM,
P. ZSIGMONDY.